(No Model.)

A. BENZIE.
DRILLING TOOL.

No. 385,088. Patented June 26, 1888.

WITNESSES
John W. Deemor
C. Sedgwick

INVENTOR.
A. Benzie
BY Munn & Co.
ATTORNEY.

UNITED STATES PATENT OFFICE.

ALEXANDER BENZIE, OF BROOKLYN, NEW YORK.

DRILLING-TOOL.

SPECIFICATION forming part of Letters Patent No. 385,088, dated June 26, 1888.

Application filed April 25, 1888. Serial No. 271,776. (No model.)

*To all whom it may concern:*

Be it known that I, ALEXANDER BENZIE, of Brooklyn, in the county of Kings and State of New York, have invented a new and useful Improvement in Drilling-Tools, of which the following is a full, clear, and exact description.

The object of this invention is to provide a simple and efficient drilling-tool adapted to a lathe or the like, which, while drilling a hole, will at the same time serve as a reamer to smoothly finish the hole, and which, if broken in working, can readily be extracted from the hole to permit the work to be continued with a fresh tool.

The invention consists of a drilling-tool of a novel and peculiar construction, substantially as hereinafter fully described, and as distinctly claimed.

Reference is to be had to the accompanying drawings, forming a part of this specification, in which similar letters of reference indicate corresponding parts in all the figures.

Figure 1:
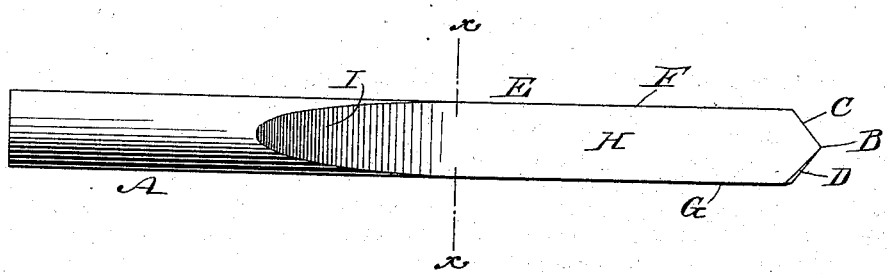
Figure 2:
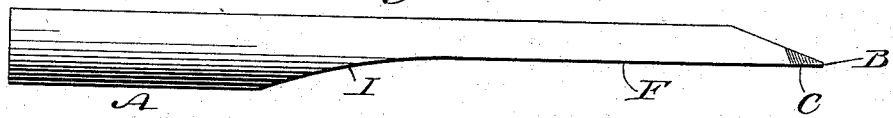
Figure 3:
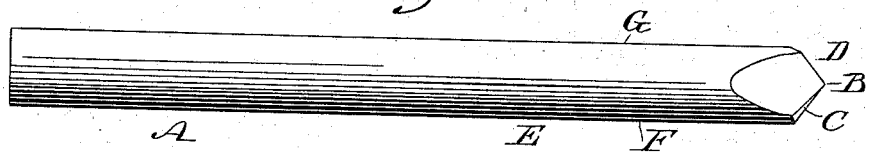
Figure 4:
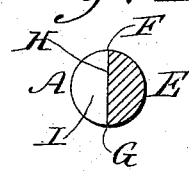

Figure 1 is a face view of a drilling-tool embodying my improvement. Fig. 2 is an edge view of the said tool. Fig. 3 is a rear view of the same. Fig. 4 is a cross-sectional view on the line *x x*, Fig. 1.

The tool thus illustrated to show how my invention may be carried into effect is formed, in the usual manner, with a shank, A, adapted to the chuck of a lathe or kindred machine, a centering-point, B, and beveled end cutting-edges, C D, converging from opposite sides to the point B.

The working-body E of the tool, which is usually of cylindrical form, like the shank A, is here made, preferably by milling, semi-cylindrical in cross section, so as to form two diametrically-opposite and parallel longitudinal cutting-edges, F G, terminating at the outer ends of the end cutting-edges, C D, respectively.

The depressed surface H between the longitudinal cutting-edges F G may be concave or convex, instead of, as shown, flat, and at its inner end rises to the surface of the shank A by a gradual incline, I.

The side cutting-edges, F and G, will, while the tool is working through a resisting substance, at the same time act efficiently to ream out the walls of the hole bored and give a smooth finish to the same.

From the described situation and direction of the side cutting-edges the tool, if broken in boring, will loosen itself in the hole, and thus can be easily removed therefrom.

The parallel reaming-edges being straight, a straight course will be formed, through which the drillings will pass freely, so as not to interfere with the proper working of the tool.

Having thus described my invention, what I claim as new, and desire to secure by Letters Patent, is—

1. A drilling tool formed with a shank, A, a centering-point, B, end cutting-edges, C D, and straight side reaming-edges, F G, substantially as shown and described.

2. A drilling-tool formed with a shank, A, a centering-point, B, end cutting-edges, C D, converging to the point B, and straight longitudinal side reaming-edges, F G, terminating at the outer ends of the end cutting-edges, C D, substantially as shown and described.

3. A drilling-tool formed with a shank, A, a centering-point, B, opposite end cutting-edges, C D, and parallel and diametrically-opposite side reaming-edges, F G, the surface between which is depressed and rises to the surface of the shank A by an incline, I, substantially as shown and described.

ALEXANDER BENZIE.

Witnesses:
M. F. KERRIGAN,
HENRY B. WHITE.